(No Model.)
S. BOAL.
COOKING STOVE.
No. 560,676. Patented May 26, 1896.
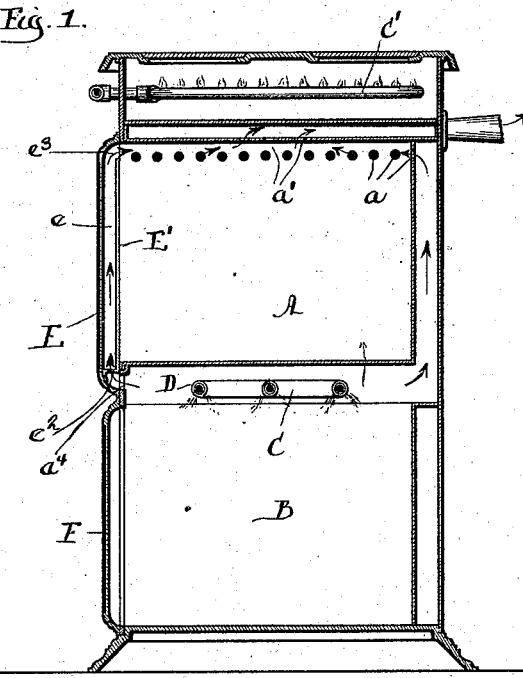
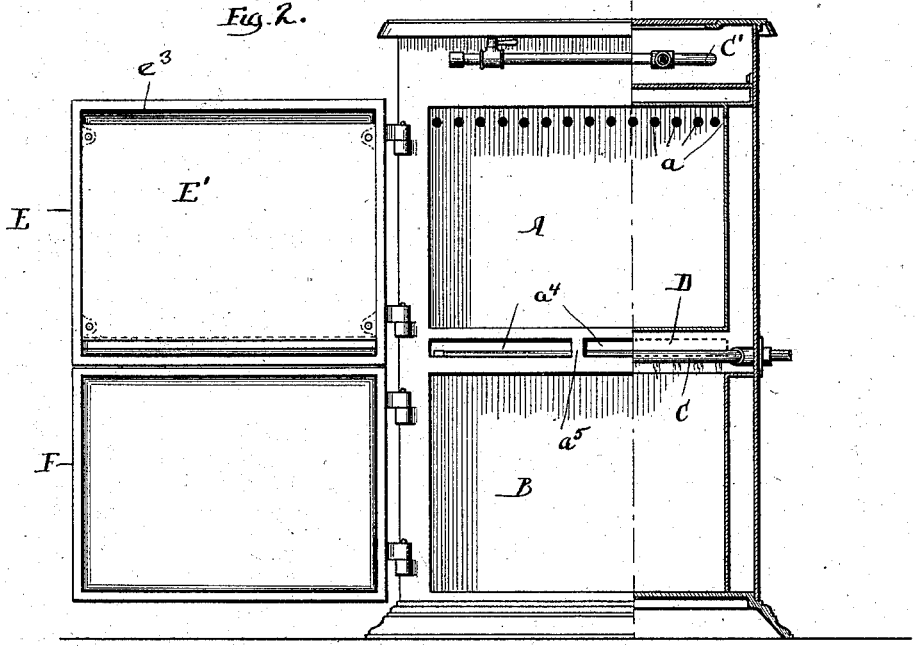
Witnesses:
Fred Gerlach
Alberta Adamick
Inventor:
Stanhope Boal
By Penn Fisher
Attorneys.

UNITED STATES PATENT OFFICE.

STANHOPE BOAL, OF PIQUA, OHIO.

COOKING-STOVE.

SPECIFICATION forming part of Letters Patent No. 560,676, dated May 26, 1896.

Application filed November 11, 1895. Serial No. 568,559. (No model.)

*To all whom it may concern:*

Be it known that I, STANHOPE BOAL, a citizen of the United States, and a resident of Piqua, in the State of Ohio, have invented certain new and useful Improvements in Cooking-Stoves, of which I do declare the following to be a full, clear, and exact description, reference being had to the accompanying drawings, forming a part of this specification.

My present invention, while applicable, so far as its broad features are concerned, to other types of cooking-stoves, is directed more especially to the improvement of gas-stoves designed for culinary purposes.

The object of my invention is to provide an improvement in cooking-stoves that will enable the front of the oven to be heated, so that a uniformity of temperature within all parts of the oven may be maintained. This object of invention I have accomplished by the improvements hereinafter described, illustrated in the accompanying drawings, and particularly pointed out in the claims at the end of this specification.

Figure 1 is a view in vertical section through Fig. 2, the doors being shown in closed position. Fig. 2 is a front view of a gas-stove embodying my invention, the baking-oven and door being shown in open position.

The body of the stove may be of the usual or any suitable construction, one familiar form of gas-stove being illustrated in the drawings. The body of the stove is shown as provided with the ovens A and B, the upper oven A being the usual baking-oven, and the lower oven B being the usual broiling-oven. Between the ovens A and B extends the gas-burner C, and I have shown a similar burner C' located within the usual top compartment of the stove above the baking-oven A, the burners C and C' being supplied with gas through the usual delivery-pipes. The space D between the upper and lower ovens, in which space the burner C is located, I call for convenience the "heating" or "fuel" chamber, since from this chamber is derived the heat by which baking within the oven A is effected.

In the construction of gas-stove illustrated in the drawings the upper oven A is surrounded upon the sides and back by flues or spaces through which the heated air or products of combustion from the heating or fuel chamber D will pass by way of the perforations $a$ into the top of the baking-oven A, whence they will escape through the perforation $a'$, formed in the top of the oven. It is manifest, however, that for the purposes of my invention it is immaterial whether the products of combustion be led directly into the top of the oven A or be carried around the oven, as in practice is sometimes done.

To the front of the stove-body are hinged doors E and F for closing the fronts of the baking and broiling ovens, respectively. The baking-oven door E is chambered or provided with a flue $e$, through which heated air or products of combustion may pass in order to effectively heat the front part of the oven A. The inner surface of the door E is preferably covered with an asbestos lining to better retain the heat, and to the door E is attached the sheet-metal plate E', which with the front of the door E forms the chamber or flue $e$. The plate E' is shown as extended inwardly at its bottom and bolted to the front plate of the door E, the bottom of the plate E' being provided with holes $e^2$ and the top of the plate E' terminating beneath the top of the door E in order to form a passage-way $e^3$ for the heated air or the products of combustion. Through the front plate of the stove-body are formed openings (one or more) $a^4$, constituting a conduit for the passage of heated air or products of combustion from the heating or fuel chamber D to the chamber $e$ of the front door of the baking-oven. I have shown the front plate of the stove as formed with two openings or conduits $a^4$, these openings or conduits being separated by a web $a^5$, in order to give greater strength to the front plate of the stove. The door E of the baking-oven A, instead of terminating at the bottom of the oven in the usual manner, is extended to a sufficient distance beneath the bottom of the oven to close over the openings or conduits $a^4$, so that when the oven-door E is closed the heating or fuel chamber D is placed in communication with the chamber $e$ of the door.

From the foregoing description it will be seen that when it is desired to heat the oven A and the burner C is lighted for such purpose the heated air and products of combustion from the chamber D will pass not only around the sides and back of the oven A in the usual manner, but by the conduits or openings $a^4$ will pass into the chamber of the door E, thereby serving to effectively heat the front of the oven. The heated air and products of combustion passing into the top of the oven by the perforations in its sides and back near the top and from the top of the door-chamber $e$ will escape thence through the top plate of the oven in the usual manner. It will thus be seen that a uniformity of temperature throughout all parts of the oven may be maintained, the front part of the oven being heated as effectively as are the back and side portions.

While I have described what I regard as the preferred embodiment of my invention, it is manifest that the details of construction may be widely varied without departing from the spirit of the invention, and I do not wish, therefore, that the invention should be understood as limited to the details of construction above set out. Thus, for example, it is manifest that the feature of providing the front door of an oven with a chamber or flue that serves as a passage-way for products of combustion or heated air may be employed with advantage in other types of stoves than those in which gas is the fuel used and regardless of whether the products of combustion be admitted to the oven or not.

Having thus described the invention, what I claim as new, and desire to secure by Letters Patent, is—

1. In a cooking-stove, the combination with an oven, of a door having a flue or chamber provided with transversely-extending openings at its bottom and top for the passage of heated air or products of combustion, a heating-chamber beneath said oven having a transverse opening at its front in position to coincide with the transverse opening at the bottom of the oven-door, the transverse opening at the top of the door being arranged to return the heated air or products of combustion into the stove, substantially as described.

2. In a cooking-stove, the combination with an oven, of a door having a flue or chamber provided with transversely-extending openings at its bottom and top for the passage of heated air or products of combustion, the lower portion of said door extending downwardly to a distance below the bottom of the oven, a heating-chamber located beneath the oven and having in its front wall transverse openings adapted to coincide with the transverse openings across the bottom of the oven-door, the openings at the top of the oven-door opening inward and being arranged to return the heated air or products of combustion into the stove, substantially as described.

STANHOPE BOAL.

Witnesses:
 W. C. MILLER,
 GEO. P. FISHER, Jr.